(12) United States Patent
Wu

(10) Patent No.: US 11,089,382 B2
(45) Date of Patent: Aug. 10, 2021

(54) MULTIMEDIA STREAMING AND NETWORK APPARATUS AND OPERATION METHOD OF THE SAME

(71) Applicant: Realtek Semiconductor Corporation, Hsinchu (TW)

(72) Inventor: Yi-Kuan Wu, Taoyuan (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 305 days.

(21) Appl. No.: 16/208,809

(22) Filed: Dec. 4, 2018

(65) Prior Publication Data
US 2020/0053431 A1 Feb. 13, 2020

(30) Foreign Application Priority Data

Aug. 8, 2018 (TW) .................................. 107127674

(51) Int. Cl.
| | |
|---|---|
| *H04N 21/6375* | (2011.01) |
| *H04L 29/06* | (2006.01) |
| *H04N 21/25* | (2011.01) |
| *H04N 21/443* | (2011.01) |
| *H04N 21/472* | (2011.01) |
| *H04N 21/61* | (2011.01) |
| *H04N 21/6405* | (2011.01) |
| *H04N 21/647* | (2011.01) |

(52) U.S. Cl.
CPC ..... *H04N 21/6375* (2013.01); *H04L 65/4076* (2013.01); *H04N 21/25* (2013.01); *H04N 21/4437* (2013.01); *H04N 21/47217* (2013.01); *H04N 21/6175* (2013.01); *H04N 21/6405* (2013.01); *H04N 21/647* (2013.01)

(58) Field of Classification Search
CPC ........... H04N 21/6375; H04N 21/4437; H04N 21/47217; H04N 21/6175; H04N 21/6405; H04N 21/647; H04L 65/4076; H04L 65/407
USPC ........................................................ 709/227
See application file for complete search history.

(56) References Cited

U.S. PATENT DOCUMENTS

| | | | |
|---|---|---|---|
| 6,937,574 B1* | 8/2005 | Delaney | H04L 12/4641 370/254 |
| 2010/0107200 A1* | 4/2010 | Drang | H04N 21/231 725/93 |

(Continued)

*Primary Examiner* — Younes Naji
(74) *Attorney, Agent, or Firm* — Locke Lord LLP; Tim Tingkang Xia, Esq.

(57) ABSTRACT

A multimedia streaming and network apparatus is provided that includes a router module, a storage module and a processing module for executing the application program in the storage module to perform the multimedia streaming and network apparatus operation method. A first streaming request packet corresponding to a physical STB is received through a LAN port. A multicast and hardware offload function corresponding to the LAN port is activated. A STB virtual machine is operated to perform a STB function. A second streaming request packet corresponding to the STB virtual machine is received. A multicast and hardware offload function corresponding to the processing module port is activated. A video stream from a remote server is transmitted by the router module through the LAN port and the processing module port respectively to the physical STB and the STB virtual machine to be processed and playback.

8 Claims, 3 Drawing Sheets

(56) References Cited

U.S. PATENT DOCUMENTS

| | | | |
|---|---|---|---|
| 2017/0272783 A1* | 9/2017 | Bachmutsky | H04N 21/2665 |
| 2018/0041555 A1* | 2/2018 | Manohar | H04L 45/021 |
| 2018/0069903 A1* | 3/2018 | Levy | H04L 65/605 |
| 2019/0180330 A1* | 6/2019 | Fein | G06Q 30/0275 |

* cited by examiner

MULTIMEDIA STREAMING AND NETWORK APPARATUS AND OPERATION METHOD OF THE SAME

RELATED APPLICATIONS

This application claims priority to Taiwan Application Serial Number 107127674, filed Aug. 8, 2018, which is herein incorporated by reference.

BACKGROUND

Field of Invention

The present invention relates to a multimedia streaming technology. More particularly, the present invention relates to a multimedia streaming and network apparatus and an operation method of the same.

Description of Related Art

Along with the coming of age of network, there are more and more multimedia streaming providers to provide different ways to supply video streaming service. The data of the multimedia stream needs to be transmitted through network. As a result, the general user has to dispose a network apparatus and a multimedia streaming apparatus at the same time such that the network can be accessed through the network apparatus while the video stream received from the network can be processed by the multimedia streaming apparatus.

For the user, disposing both the network apparatus and the multimedia streaming apparatus has a higher cost of both money and space. However, a compound device that integrates the network apparatus and the multimedia streaming apparatus can not provide the multicast function and the hardware offload function at the same time. The issues that the compound device can not receive multicast packets and the computation amount of the processor therein greatly increases are thus generated.

Accordingly, what is needed is a multimedia streaming and network apparatus and an operation method of the same to address the issues mentioned above.

SUMMARY

An aspect of the present invention is to provide a multimedia streaming and network apparatus is provided that includes a router module, a storage module and a processing module. The storage module is configured to store an application program. The processing module is electrically coupled to the router module and the storage module and is configured to perform network communication through the router module and to retrieve and execute the application program to perform a multimedia streaming and network apparatus operation method. The multimedia streaming and network apparatus operation method includes the steps outlined below. A first stream request packet corresponding to an external physical STB (set-top box) is received through a LAN port. A multicast and hardware offload function of the router module corresponding to the LAN port is activated. A STB virtual machine is operated to perform a STB function. A second stream request packet corresponding to the STB virtual machine is received. The multicast and hardware offload function of the router module corresponding to a processing module port is activated. At least a video stream from a remote server is transmitted by the router module through the LAN port and the processing module port respectively to the physical STB and the STB virtual machine to be processed and playback.

Another aspect of the present invention is to provide a multimedia streaming and network apparatus operation method used in a multimedia streaming and network apparatus that includes a router module, a storage module configured to store an application program and a processing module electrically coupled to the router module and the storage module and configured to perform network communication through the router module and to retrieve and execute the application program to perform the multimedia streaming and network apparatus operation method. The multimedia streaming and network apparatus operation method includes the steps outlined below. A first stream request packet corresponding to an external physical STB (set-top box) is received through a LAN port. A multicast and hardware offload function of the router module corresponding to the LAN port is activated. A STB virtual machine is operated to perform a STB function. A second stream request packet corresponding to the STB virtual machine is received. The multicast and hardware offload function of the router module corresponding to a processing module port is activated. At least a video stream from a remote server is transmitted by the router module through the LAN port and the processing module port respectively to the physical STB and the STB virtual machine to be processed and playback.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
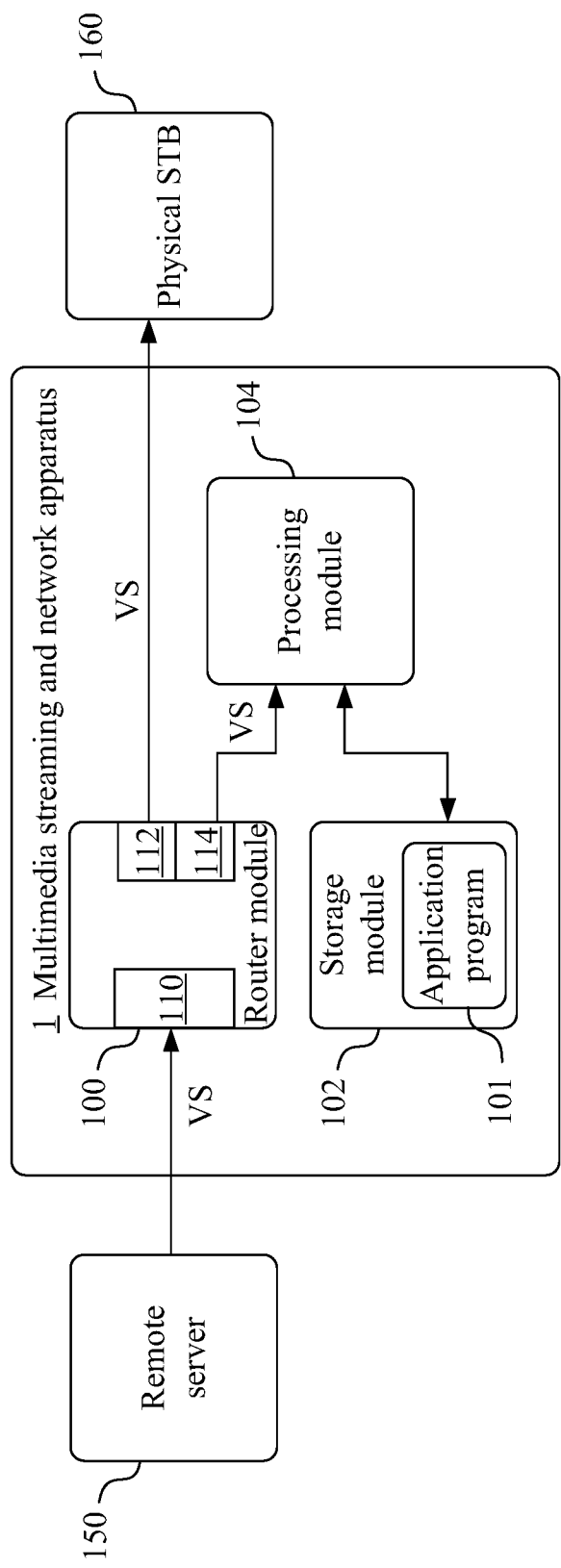
FIG. 1 is a block diagram of a multimedia streaming and network apparatus in an embodiment of the present invention.

Reference is now made to FIG. 1. FIG. 1 is a block diagram of a multimedia streaming and network apparatus 1 in an embodiment of the present invention. The multimedia streaming and network apparatus 1 includes a router module 100, a storage module 102 and a processing module 104.

The router module 100 is a network communication module having router function. In an embodiment, the router module 100 performs communication with external wide area network to access a remote server 150. Further, the router module 100 performs communication with local area network to communicate with such as, but not limited to a physical STB (set-top box) 160 illustrated in FIG. 1.

In an embodiment, the router module 100 includes a plurality of communication ports to perform different types of network communication. For example, the router module 100 includes a WAN port 110, a LAN port 112 and a processing module port 114. The router module 100 performs communication with the external wide area network through the WAN port 110, performs communication with the local area network through the LAN port 112 and performs communication with the processing module 104 through the processing module port 114.

The storage module 102 can be a random access storage module (RAM), a read only storage module (ROM), a flash memory module, a floppy disk, a hard disk, an optical disk, a portable hard drive, a magnetic tape, a database that can be accessed through network or other storage modules that can perform identical function known by those skilled in the art. The storage module 102 is configured to store an application program 101. In other embodiments, the storage module 102 is configured to store other application programs, machine executable commands, data or a combination thereof.

The processing module 104 is electrically coupled to the router module 100 and the storage module 102. As a result, the processing module 104 can access the network through the router module 100 and perform communication with such as, but not limited to remote server 150 and the physical STB 160 described above. Further, the processing module 104 can access the storage module 102 to store the processed data in the storage module 102 and retrieve and process the data in the storage module 102.

In an embodiment, the processing module 104 is configured to retrieve the application program 101 from the storage module 102 to operate the function of the multimedia streaming and network apparatus 1.

More specifically, after the processing module 104 executes the application program 101, the multimedia streaming and network apparatus 1 can perform the functions of both multimedia streaming and network routing. For example, when the software STB operated in the processing module 104 and/or the physical STB 160 request the video stream, the multimedia streaming and network apparatus 1 can receive the video stream VS from the remote server 150 through the router module 100 and further transmit the video stream VS to the software STB operated in the processing module 104 and/or the physical STB 160 to be processed and playback by using the multicast mechanism.

Figure 2:
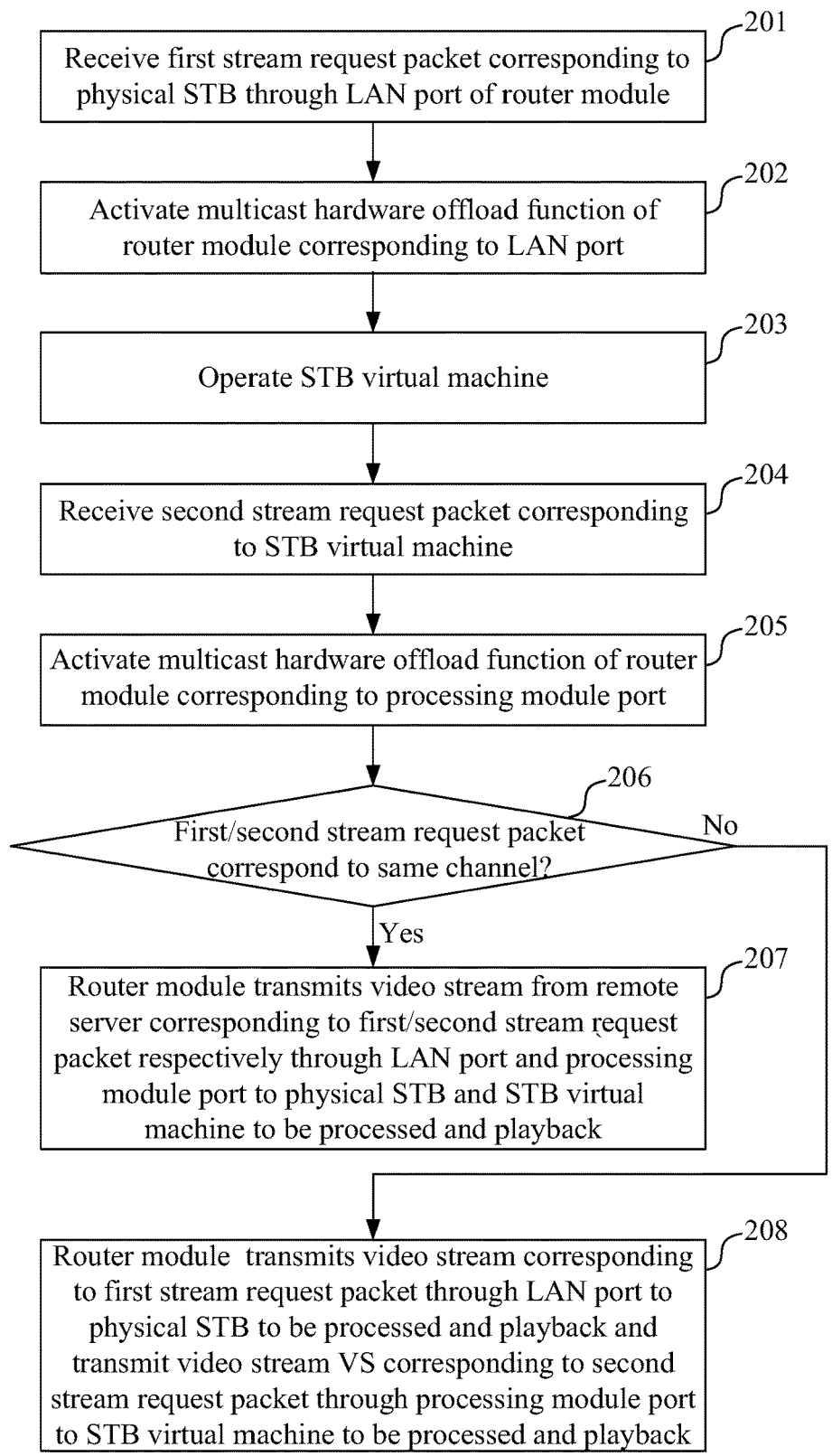
FIG. 2 is a flow chart of a multimedia streaming and network apparatus operation method in an embodiment of the present invention.
Figure 3:
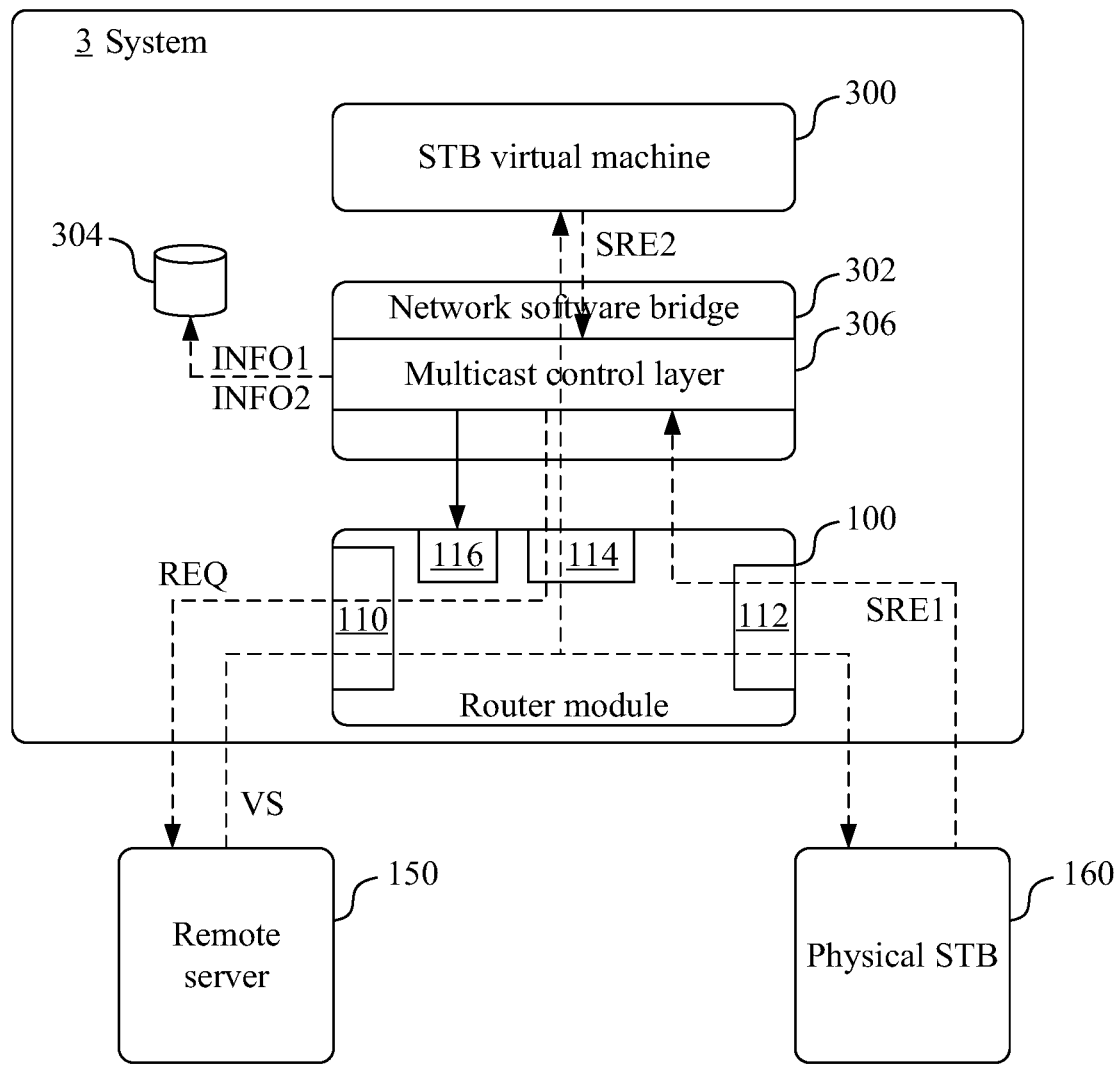
FIG. 3 is a block diagram of a system implemented by the multimedia streaming and network apparatus in an embodiment of the present invention.

Reference is now made to FIG. 2 and FIG. 3 at the same time. The detail of the function of the multimedia streaming and network apparatus 1 is described in the following paragraphs in accompany with FIG. 2 and FIG. 3.

FIG. 2 is a flow chart of a multimedia streaming and network apparatus operation method 200 in an embodiment of the present invention. The multimedia streaming and network apparatus operation method 200 can be used in the multimedia streaming and network apparatus 1 in FIG. 1.

FIG. 3 is a block diagram of a system 3 implemented by the multimedia streaming and network apparatus 1 in an embodiment of the present invention. When the application program 101 is executed by the processing module 104, the application program 101 operates as the system 3 to operate the multimedia streaming and network apparatus operation method 200.

The system 3 includes a software part and a hardware part. The software part includes a STB virtual machine 300, a network software bridge 302 and a multicast group list 304 that are software modules operated based on the execution of the application program 101 by the processing module 104 in FIG. 1. As a result, the following description of the operation of the STB virtual machine 300, the network software bridge 302 and the multicast group list 304 can be considered as the operations performed when the application program 101 is executed by the processing module 104.

The hardware part includes the router module 100 in FIG. 1. The network software bridge 302 is a communication interface between the software (STB virtual machine 300) and the hardware (router module 100) and includes a multicast control layer 306 serving as the processing core of the communication and the setting of the multicast mechanism.

The multimedia streaming and network apparatus operation method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the multicast control layer 306 receives a first stream request packet SRE1 corresponding to the physical STB 160 through the LAN port 112 of the router module 100.

In an embodiment, the physical STB 160 receives a command from such as, but not limited to a remote controller operated by a user such that the command generates a stream request packet 301. The multicast control layer 306 further receives the first stream request packet SRE1 through the LAN port 112 of the router module 100 accordingly.

The stream request packet 301 may include information related to the video stream that the user wants to watch, such as but not limited to an identification number of the channel.

In step 202, the multicast control layer 306 activates a multicast and hardware offload function of the router module 100 corresponding to the LAN port 112.

In an embodiment, the multicast control layer 306 stores the information INFO1 of the LAN port 112 and the physical STB 160 in the multicast group list 304. The multicast group list 304 can be stored in such as, but not limited to the storage module 102 illustrated in FIG. 1.

Subsequently, the multicast control layer 306 updates a multicast register 116 of the router module 100 to add the LAN port 112.

By using the method described above, the multicast control layer 306 can finish the setup of the software (multicast group list 304) and the hardware (multicast register 116) such that the router module 100 activates the multicast and hardware offload function of the router module 100 corresponding to the LAN port 112.

In an embodiment, the first stream request packet SRE1 described above is a packet of Internet Group Management Protocol (IGMP), and the multicast group list 304 is a network group management protocol group list to accomplish the communication and the setting of the multicast through the network group management protocol.

In step 203, the STB virtual machine 300 is operated to access such as, but not limited to the hardware resource of the multimedia streaming and network apparatus 1 to perform a STB function.

In an embodiment, the multicast control layer 306 can establish a virtual system environment by executing such as, but not limited to Xen architecture or other operation systems to further establish and manage the STB virtual machine 300 in the virtual system environment.

In step 204, a second stream request packet SRE2 corresponding to the STB virtual machine 300 is received.

In an embodiment, the second stream request packet SRE2 can be generated by a remote controller operated by a user such that the second stream request packet SRE2 is received by a receiving module (not illustrated) of the multimedia streaming and network apparatus 1, transmitted to the processing module 104 and processed by the STB virtual machine 300 operated in the processing module 104.

The second stream request packet SRE2 may include information related to the video stream that the user wants to watch, such as but not limited to an identification number of the channel.

In step 205, the multicast control layer 306 activates the multicast and hardware offload function of the router module 100 corresponding to the processing module port 114.

In an embodiment, the multicast control layer 306 stores the information INFO2 of the processing module port 114 and the STB virtual machine 300 in the multicast group list 304.

Subsequently, the multicast control layer 306 updates the multicast register 116 of the router module 100 to add the processing module port 114.

By using the method described above, the multicast control layer 306 can finish the setup of the software (multicast group list 304) and the hardware (multicast register 116) such that the router module 100 activates the multicast and hardware offload function of the router module 100 corresponding to the processing module port 114.

In an embodiment, the second stream request packet SRE2 described above is a packet of Internet Group Management Protocol (IGMP), and the multicast group list 304 is a network group management protocol group list to accomplish the communication and the setting of the multicast through the network group management protocol.

In step 206, whether the first stream request packet SRE1 and the second stream request packet SRE2 correspond to a same channel is determined.

When the first stream request packet SRE1 and the stream request packet second SRE2 corresponds to the same channel, in step 207, the router module 100 receives the video stream VS from the remote server 150 and transmits the video stream VS corresponding to the first stream request packet SRE1 and the stream request packet second SRE2 respectively through the LAN port 112 and the processing module port 114 to the physical STB 160 and the STB virtual machine 300 to be processed and playback.

More specifically, the router module 100 only transmits a single video stream request packet REQ to the remote server 150 and receives the single video stream VS from the remote server 150 through the WAN port 110. The router module 100 can transmit the video stream VS to the physical STB 160 and the STB virtual machine 300 by using the multicast mechanism.

For example, the router module 100 transmits the video stream request packet REQ after receiving the first stream request packet SRE1 and transmits the video stream VS to the physical STB 160 upon receiving the video stream VS. After receiving the second stream request packet SRE2, the router module 100 does not need to transmit the video stream request packet REQ again. Instead, the router module 100 can directly share the received video stream VS to the STB virtual machine 300.

For the physical STB 160, the router module 100 transmits the video stream VS directly through the LAN port 112 by using the hardware offload function such that the video stream VS is not processed by the software. The transmission speed of the video stream VS can thus be increased. For the STB virtual machine 300, the router module 100 transmits the video stream VS through the processing module port 114 such that the video stream VS is processed by the STB virtual machine 300, which is operated by software. As a result, the software can also be involved in the multicast mechanism.

When the first stream request packet SRE1 and the stream request packet second SRE2 correspond to a first channel and a second channel different from each other, in step 208, the router module 100 transmits the video stream VS corresponding to the first stream request packet SRE1 through the LAN port 112 to the physical STB 160 to be processed and playback and transmit the video stream VS corresponding to the second stream request packet SRE2 through the processing module port 114 to the STB virtual machine 300 to be processed and playback.

More specifically, the router module 100 needs to transmit two different video stream request packets REQ to the remote server 150 and receive two different video streams VS from the remote server 150 to transmit the two video streams VS, respectively to the physical STB 160 and the STB virtual machine 300.

It is appreciated that in an implemented scenario, take the LAN port of the physical STB 160 as an example, the multicast control layer 306 actually transmits the video stream request packet REQ to the remote server 150 first after the information INFO1 is stored in the multicast group list 304. Subsequently, after the remote server 150 receives the request and starts to transmit the video stream VS, the multicast control layer 306 receives the video stream VS from the remote server 150 through the WAN port 110 of the router module 100. Under such a condition, the video stream VS is still processed by the software (operated in the processing module 104). Further, the multicast control layer 306 updates the multicast register 116 of the router module 100 to add the LAN port 112 such that the following video stream VS is directly transmitted to the physical STB 160 by the hardware (router module 100).

Since the multicast and hardware offload function of the router module 100 is activated, the video stream VS needs not to be processed by the software through the multicast control layer 306. After the video stream VS is received through the WAN port 110 by the router module 100, the video stream VS can be directly transmitted to the physical STB 160 through the LAN port 112 to be processed and playback.

It is appreciated that in the flow illustrated in FIG. 2, the stream request is first generated by the physical STB 160 and the other stream request is generated by the STB virtual machine 300 subsequently. In other embodiments, the stream request can be first generated by the STB virtual machine 300 such that the other stream request is generated by the physical STB 160 subsequently.

Moreover, the system 3 illustrated in FIG. 3 is merely an example. In other embodiments, a system having different software modules can be operated according to different application programs 101 executed by the processing module 104.

The advantage of the present invention is to activate the multicast and hardware offload function of the LAN port and the processing module port of the multimedia streaming and network apparatus such that the physical STB and the STB virtual machine can simultaneously receive the video stream from the remote server through the router module to further process and playback the video stream. As a result, the multimedia streaming and network apparatus can maintain the hardware offload function of the physical STB and support the multicast streaming of the STB virtual machine operated in the software.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multimedia streaming and network apparatus comprising:
    a router module having a local area network (LAN) port and a processing module port;
    a storage module configured to store an application program; and
    a processor electrically coupled to the router module and the storage module and configured to perform network communication through the router module and to retrieve and execute the application program to perform a multimedia streaming and network apparatus operation method comprising:
        receiving a first stream request packet corresponding to an external physical STB (set-top box) through the LAN port;
        activating a multicast and hardware offload function of the router module corresponding to the LAN port;
        operating a STB virtual machine to perform a STB function;
        receiving a second stream request packet corresponding to the STB virtual machine;
        activating the multicast and hardware offload function of the router module corresponding to the processing module port; and
        transmitting at least a video stream from a remote server by the router module through the LAN port and the processing module port respectively to the physical STB and the STB virtual machine to be processed;
    wherein the step of activating the multicast and hardware offload function of the router module corresponding to the LAN port further comprises:
        storing information of the LAN port and the physical STB in an multicast group list; and
        updating a multicast register of the router module to add the LAN port therein;
    wherein the step of activating the multicast and hardware offload function of the router module corresponding to the processing module port further comprises:
        storing information of the processing module port and the STB virtual machine in the multicast group list; and
        updating the multicast register of the router module to add the processing module port therein.

2. The multimedia streaming and network apparatus of claim 1, wherein the multimedia streaming and network apparatus operation method further comprises:
    determining that the first stream request packet and the second stream request packet correspond to a same channel;
    transmitting a video stream request packet to the remote server by the router module according to the channel; and
    receiving the video stream from the remote server and transmitting the video stream respectively through the LAN port and the processing module port to the physical STB and the STB virtual machine to be processed.

3. The multimedia streaming and network apparatus of claim 1, wherein the multimedia streaming and network apparatus operation method further comprises:
    determining that the first stream request packet and the second stream request packet respectively correspond to a first channel and a second channel different from each other;
    transmitting a first video stream request packet to the remote server by the router module according to the first channel;
    receiving a first video stream from the remote server and transmitting the first video stream through the LAN port to the physical STB to be processed and playback;
    transmitting a second video stream request packet to the remote server by the router module according to the second channel; and
    receiving a second video stream from the remote server and transmitting the second video stream through the processing module port to the STB virtual machine to be processed.

4. The multimedia streaming and network apparatus of claim 1, wherein the router module receives the video stream from the remote server through a wide area network (WAN) port.

5. A multimedia streaming and network apparatus operation method used in a multimedia streaming and network apparatus that comprises a router module having a local area network (LAN) port and a processing module port, a storage module configured to store an application program and a processor electrically coupled to the router module and the storage module and configured to perform network communication through the router module and to retrieve and execute the application program to perform the multimedia streaming and network apparatus operation method, wherein the multimedia streaming and network apparatus operation method comprises:
    receiving a first stream request packet corresponding to an external physical STB through the LAN port;
    activating a multicast and hardware offload function of the router module corresponding to the LAN port;
    operating a STB virtual machine to perform a STB function;
    receiving a second stream request packet corresponding to the STB virtual machine;
    activating the multicast and hardware offload function of the router module corresponding to the processing module port; and
    transmitting at least a video stream from a remote server by the router module through the LAN port and the processing module port respectively to the physical STB and the STB virtual machine to be processed;
    wherein the step of activating the multicast and hardware offload function of the router module corresponding to the LAN port further comprises:
        storing information of the LAN port and the physical STB in an multicast group list; and
        updating a multicast register of the router module to add the LAN port therein;
    wherein the step of activating the multicast and hardware offload function of the router module corresponding to the processing module port further comprises:
        storing information of the processing module port and the STB virtual machine in the multicast group list; and
        updating the multicast register of the router module to add the processing module port therein.

6. The multimedia streaming and network apparatus operation method of claim 5, further comprising:

determining that the first stream request packet and the second stream request packet correspond to a same channel;

transmitting a video stream request packet to the remote server by the router module according to the channel; and receiving the video stream from the remote server and transmitting the video stream respectively through the LAN port and the processing module port to the physical STB and the STB virtual machine to be processed.

7. The multimedia streaming and network apparatus operation method of claim 5, further comprising:

determining that the first stream request packet and the second stream request packet respectively correspond to a first channel and a second channel different from each other;

transmitting a first video stream request packet to the remote server by the router module according to the first channel;

receiving a first video stream from the remote server and transmitting the first video stream through the LAN port to the physical STB to be processed and playback;

transmitting a second video stream request packet to the remote server by the router module according to the second channel; and receiving a second video stream from the remote server and transmitting the second video stream through the processing module port to the STB virtual machine to be processed.

8. The multimedia streaming and network apparatus operation method of claim 5, wherein the router module receives the video stream from the remote server through a wide area network (WAN) port.

\* \* \* \* \*